UNITED STATES PATENT OFFICE 2,359,208

β-SUBSTITUTED-Δ^{α,β}-γ-BUTYROLACTONES AND β-SUBSTITUTED-β-HYDROXY-γ-BUTYROLACTONES AND THE METHODS OF PREPARING THEM

Robert C. Elderfield, Hastings on Hudson, N. Y., and Martin Rubin, Baltimore, Md., assignors to Eli Lilly and Company, Indianapolis, Ind., a corporation of Indiana No Drawing. Application March 21, 1941, Serial No. 384,586

11 Claims. (Cl. 260—344)

This invention relates to a β-substituted-Δ^{α,β}-γ-butyrolactones and to β-substituted-β-hydroxy-γ-butyrolactones and to the methods of preparing them.

The compositions of this invention are represented by the following formulas:

(1) 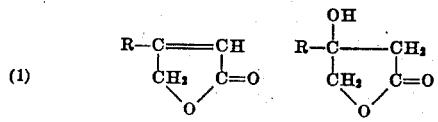

in which R is a member of the class which consists of acylic and carbocyclic groups derived from acylic and carbocyclic compounds respectively, which compounds are capable of reacting with magnesium to form a Grignard's reagent. A Grignard's reagent is any one of a group of organic magnesium compounds of the general type $R_3$—Mg—Y in which $R_3$ is an organic radical and Y is a halogen. The acylic and carbocyclic groups may contain one or more substituents such as hydroxyl, alkyl, alkenyl, and alkoxy. Sometimes it is necessary to protect the substituent group in order to form the required Grignard's reagent. The compound of the protected group forms with magnesium the required Grignard's reagent.

The compositions of this invention are prepared by reacting a compound represented by the formula:

(2) 

in which R has the same meaning as before and X is a halogen of the class consisting of chlorine, bromine, and iodine, to the action of an alkoxyacetonitrile. This action may be represented by the following equation:

(3) $RMgX + R_1OCH_2CN \longrightarrow R_1OCH_2.C=NMgX$
$\phantom{(3)\ RMgX + R_1OCH_2CN \longrightarrow R_1OCH_2.C}|$
$\phantom{(3)\ RMgX + R_1OCH_2CN \longrightarrow R_1OCH_2.C}R$ in which $R_1$ is an alkyl radical, preferably the methyl or ethyl radical. The reaction is preferably carried out in the presence of an ether or of a tertiary amine. The reaction product is treated with an aqueous solution of a mineral acid and separated from inorganic constituents to form an ω-alkoxymethyl ketone. This reaction may be represented by the following equation:

(4) 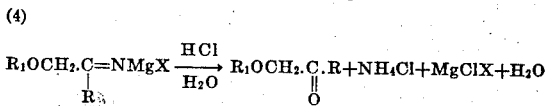

The ω-alkoxymethyl ketone is reacted with an ester of a haloacetic acid selected from the class which consists of chloroacetic acid, bromoacetic acid, and iodoacetic acid ($ZCH_2.COOR_2$ in which $R_2$ represents an alkyl radical, preferably the methyl or ethyl radical, and Z represents chlorine, bromine, or iodine) in the presence of zinc in an inert solvent, such as benzene or toluene. Preferably this mixture is refluxed and the reaction product is treated with an aqueous solution of a mineral acid, such as hydrochloric acid, which is cooled to approximately 0° C. and separated from inorganic constituents to form an ester of β-R-β-hydroxy-β-alkoxymethylpropionic acid. The action which takes place is represented by the following equation:

(5) 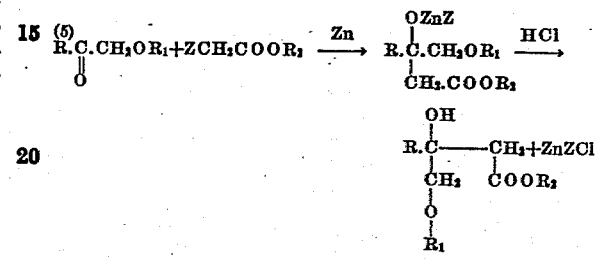

After cooling and decomposition of the zinc compound by the ice-cold dilute mineral acid, such as hydrochloric acid, the ester is separated and dried. The ester is then hydrolyzed by refluxing it with a solution of a base, such as sodium hydroxide. The corresponding salt of the β-R-β-hydroxy-β-alkoxymethyl propionic acid thus formed is converted to the free acid by acidification with a suitable mineral acid, such as sulfuric acid. The action which takes place is represented by the following equation:

(6) 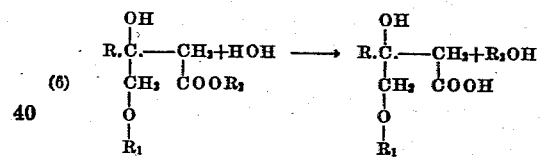

For substantially complete isolation of the β-R-β-hydroxy-β-alkoxymethylpropionic acid, the β-R-β-hydroxy-β-alkoxymethylpropionic acid is preferably extracted with ether from the reaction mixture. The ether may then be removed by distillation to yield the desired product. The β-R-β-hydroxy-β-alkoxymethylpropionic acid is then treated with hydrochloric or hydrobromic acid. The reaction may be performed in a suitable inert solvent, such as a liquid saturated aliphatic acid, or it may be conducted in the presence of the hydrochloric or hydrobromic acid alone. Preferably the β-R-β-hydroxy-β-alkoxymethylpropionic acid is refluxed at 95°–100° C. for a period of not more than 1.5 hours, during which time β-R-β-hydroxy-γ-butyrolactone is formed together with some β-R-Δ^{α,β}-γ-butyrolactone. The reaction which takes place may be represented by the following equations:

(7) 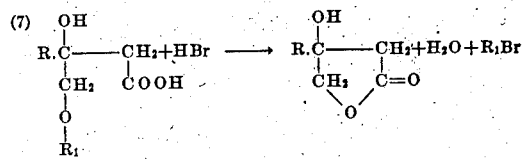

(8) 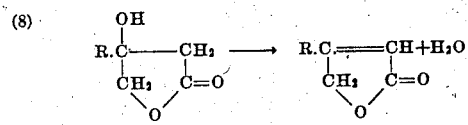

Alternately, the ester of the β-R-β-hydroxy-β-alkoxymethylpropionic acid may be refluxed with hydrobromic or hydrochloric acid, preferably in an inert solvent such as a lower saturated aliphatic acid, for a period of at least 2 hours, during which time β-R-β-hydroxy-γ-butyrolactone is formed together with some β-R-Δ^{α,β}-γ-butyrolactone. The reaction which takes place in this alternate procedure may be represented by the following equations:

(9) 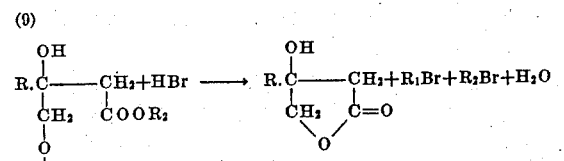

(10) 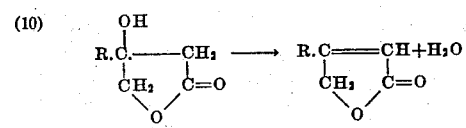

The β - R - β - hydroxy - γ - butyrolactone is then treated with hydrochloric or hydrobromic acid, preferably in an inert solvent, such as a lower aliphatic acid, at 140°–150° C. for a period of at least 2 hours during which time the β-R-Δ^{α,β}-γ-butyrolactone is formed. The reaction which takes place is represented by Equation 10.

Alternately, the β-R-β-hydroxy-β-alkoxymethyl propionic acid may be similarly treated with hydrobromic acid or hydrochloric acid by refluxing at a temperature of 140°–150° C. for a period of at least 2 hours during which time the β-R-β-Δ^{α,β}-γ-butyrolactone is formed. The reaction which takes place may be represented by the following equation:

(11) 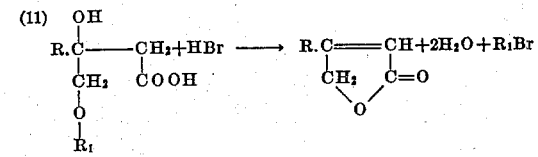

Typical examples of the compositions of this invention and the methods of preparing them are as follows:

EXAMPLE 1.—*Preparation of β-phenyl-Δ^{α,β}-γ-butyrolactone*

To a mixture of 50.1 of ω-methoxymethylphenyl ketone, 21.8 g. of granulated zinc, and 250 cc. of dry benzene in a flask provided with an efficient reflux condenser are added 55.7 g. of freshly distilled ethyl bromoacetate. On gentle warming a vigorous exothermic reaction results, during which time the zinc compound of ethyl β-phenyl-β - hydroxy - β - methoxymethyl propionate is formed. After this reaction moderates, the mixture is refluxed for approximately two hours. When cooled, the organozinc compound is decomposed with ice-cold dilute sulfuric acid. The benzene layer, which contains the ethyl β-phenyl-β-hydroxy-β-methoxymethyl propionate is separated and dried with anhydrous sodium sulfate. The benzene solution is then evaporated and the resulting oil is distilled. The ethyl β-phenyl-β-hydroxy-β-methoxymethyl propionate boils at about 112° C., corrected, at 2 mm.

The reaction which takes place may be represented by the following equation:

(12) 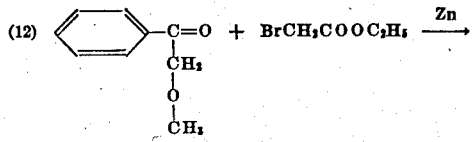

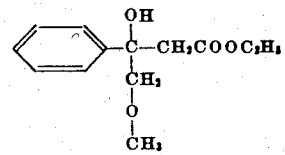

This ester is saponified by boiling with a 5 percent solution of sodium hydroxide in 50 percent alcohol for about one hour. The solution is then cooled to room temperature and acidified with a mineral acid, such as hydrochloric acid. The free acid, which is β - phenyl - β - hydroxy - β - methoxymethyl propionic acid, is extracted with ether and slowly crystallizes after removal of the solvent. Preferably it is recrystallized from petroleum ether. It melts at about 60° C., corrected.

21 g. of β-phenyl-β-hydroxy-β-methoxymethyl propionic acid is refluxed for one and one-half hours with 60 cc. of glacial acetic acid previously saturated with hydrogen bromide at 0° C. During this refluxing the β-phenyl-Δ^{α,β}-γ-butyrolactone is formed.

The reaction which takes place may be represented by the following equation:

(13) 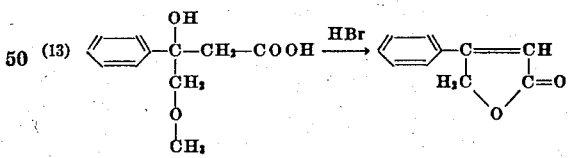

After refluxing, the solution of the desired product is cooled to about 25° C. and poured into 500 cc. of ice water upon which the crystalline lactone separates. It is filtered off and recrystallized from water. The lactone forms needles that melted at 94° C., corrected. The lactone has a fragrant odor, reduces Tollens' reagent and gives the characteristic red color with alkaline sodium nitroprusside solution. An analysis reveals 75 percent carbon and 5.3 percent hydrogen, which compares with a theoretical value of 75 percent carbon and 5 percent hydrogen.

EXAMPLE 2.—*Preparation of β-cyclohexyl-Δ^{α,β}-γ-butyrolactone and β-cyclohexyl-β-hydroxy-γ-butyrolactone*

To a well cooled solution of cyclohexyl magnesium chloride prepared from 118.6 g. of cyclohexyl chloride and 24.3 g. of magnesium in 400 cc. of ether is added drop-wise a solution of 71 g. of methoxyacetonitrile in 300 cc. of ether.

After standing for about eight hours, during which time the desired reaction is completed, the reaction mixture is treated with ice and dilute sulfuric acid. The ether layer, which contains ω-methoxymethylcyclohexyl ketone, is separated from the water layer. The ether layer is steam distilled for removal of steam volatile impurities and the methoxymethylcyclohexyl ketone is extracted from the residue with ether and distilled at reduced pressure. It boils at about 110° to 111° C., corrected at 21 mm. pressure. The ethyl β-cyclohexyl-β-hydroxy-β-methoxymethyl propionate is prepared from the ω-methoxymethylcyclohexyl ketone in the same manner as that described in Example 1 for the preparation of analogous ethyl-β-phenyl-β-hydroxy-β-methoxymethyl propionate. The β-cyclohexyl-β-hydroxy-β-methoxymethyl propionic acid is obtained from the corresponding ester by alkaline saponification. The acid is recrystallized from petroleum ether and melts at about 48° C., corrected. A mixture of 110 g. of β-cyclohexyl-β-hydroxy-β-methoxymethyl propionic acid and 210 cc. of an acetic solution of hydrogen bromide saturated at 0° C. is heated under reflux in an oil bath at a bath temperature of 95°–100° C. for 1.5 hours. After cooling the mixture is poured into ice water and the resulting solution is neutralized with sodium carbonate. β-Cyclohexyl-β-hydroxy-γ-butyrolactone separates as a crystalline solid. The solution, after filtration of the above lactone, is extracted with ether. After removal of the ether from the extract, there remains an oil which deposits crystals of β-cyclohexyl-β-hydroxy-γ-butyrolactone. The crystalline material is filtered off and the oily filtrate is treated as described below. The combined crystalline fractions of β-cyclohexyl-β-hydroxy-γ-butyrolactone are recrystallized first from ether and then from water. The β-cyclohexyl-β-hydroxy-γ-butyrolactone melts at 112° C., corrected. An analysis reveals 65.7 percent carbon and 8.8 percent hydrogen which compares with a theoretical value of 65.3 percent carbon and 8.8 percent hydrogen. The lactone is saturated toward catalytically activated hydrogen, gives negative Tollens' and nitroprusside tests and takes up one equivalent of alkali on saponification.

The β-cyclohexyl-β-hydroxy-γ-butyrolactone has the following formula:

(14) 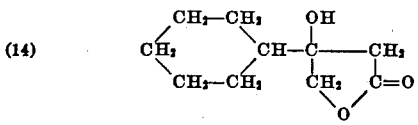

The above mentioned oily filtrate from the crystalline product is distilled at reduced pressure. The distillate which boils at 132°–135° C. corrected at 4 mm. pressure is the desired β-cyclohexyl-Δ^{α,β}-γ-butyrolactone. An analysis reveals 72.5 percent carbon and 8.8 percent hydrogen which compares with a theoretical value of 72.5 percent carbon and 8.5 percent hydrogen. The lactone gives the characteristic Tollens' and nitroprusside tests and takes up one mole of hydrogen when catalytically reduced.

The β-cyclohexyl-Δ^{α,β}-γ-butyrolactone has the following formula:

(15) 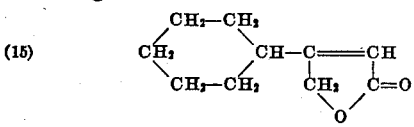

EXAMPLE 3.—*Preparation of β-cyclohexyl-Δ^{α,β}-γ-butyrolactone and β-cyclohexyl-β-hydroxy-γ-butyrolactone by the alternate method*

Cyclohexyl-ω-ethoxymethyl ketone is prepared in the same manner as the analogous methoxymethyl compound described in Example 2. From this ethyl β-cyclohexyl-β-hydroxy-β-ethoxymethyl propionate is prepared in the same manner as the analogous methoxymethyl compound described in Example 2. A mixture of 30 g. of ethyl β-cyclohexyl-β-hydroxy-β-ethoxymethyl propionate and 85 cc. of a solution of hydrogen bromide in acetic acid is refluxed over a free flame for 2 hours. The reaction mixture, which contains both the β-cyclohexyl-Δ^{α,β}-γ-butyrolactone and β-cyclohexyl-β-hydroxy-γ-butyrolactone, is then worked up as in Example 2 to obtain the two constituents. β-cyclohexyl-β-hydroxy-γ-butyrolactone as thus obtained melts at 112° C., corrected. β-cyclohexyl-Δ^{α,β}-γ-butyrolactone as thus obtained boils at 132°–135° C., corrected, at 4 mm. pressure.

EXAMPLE 4.—*Preparation of β-cyclohexyl-Δ^{α,β}-γ-butyrolactone*

β-Cyclohexyl-β-hydroxy-γ-butyrolactone is refluxed at 140°–150° C. for two hours with four volumes of a solution of hydrogen bromide in acetic acid previously saturated at 0° C. The unsaturated lactone is isolated from the reaction mixture exactly as in Example 3.

EXAMPLE 5.—*Preparation of β-n-butyl-Δ^{α,β}-γ-butyrolactone*

The ethyl β-n-butyl-β-hydroxy-β-methoxymethyl propionate is prepared from n-butyl magnesium bromide and methoxyacetonitrile in the same manner as the analogous compound described in Example 2 and the acid of this ester is produced by alkaline saponification of the ester. The ester is treated with hydrobromic acid in glacial acetic acid to form β-n-butyl-Δ^{α,β}-γ-butyrolactone which has a boiling point of about 102° C., corrected, at 1 mm. pressure. An analysis of the lactone prepared by this method reveals 68.2 percent carbon and 9 percent hydrogen compared with the calculated values of 68.5 percent carbon and 8.6 percent hydrogen. This lactone is represented by the following formula:

(16) 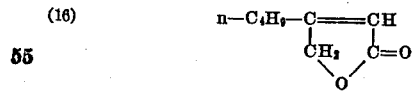

EXAMPLE 6.—*Preparation of β-cyclopentyl-Δ^{α,β}-γ-butyrolactone*

The ethyl β-cyclopentyl-β-hydroxy-β-methoxymethyl propionate is prepared from cyclopentyl magnesium chloride and methoxyacetonitrile in the same manner as the analogous compound described in Example 2, and the acid of this ester is produced by alkaline saponification of the ester. The acid is treated with hydrogen bromide in glacial acetic acid to form β-cyclopentyl-Δ^{α,β}-γ-butyrolactone which has a boiling point of about 130°–132° C., corrected, at 1.5 mm. pressure. An analysis of the lactone prepared by this method reveals 71.0 percent carbon and 8.0 percent hydrogen which compares with the calculated values of 70.4 percent carbon and 7.8 percent hydrogen. This lactone is represented by the following formula:

(17) 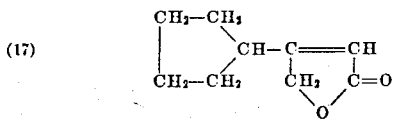

EXAMPLE 7.—Preparation of β-(p-hydroxyphenyl)-Δ^{α,β}-γ-butyrolactone

A solution of 35 g. of ethyl bromoacetate in 25 cc. of dry benzene is added drop-wise to a boiling mixture of 38 g. of p-methoxyphenyl-ω-methoxymethyl ketone, 20.9 g. of granulated zinc and 175 cc. of dry benzene in a flask equipped with a reflux condenser and stirrer. Preferably the solution of ethyl bromoacetate is added during the course of about an hour with constant stirring, and the mixture is then refluxed for 3 hours longer. The reaction mixture which contains the desired zinc complex is treated with dilute hydrochloric acid and the benzene layer is separated and dried with sodium sulfate. During this time the desired ethyl β-(p-methoxyphenyl)-β-hydroxy-β-methoxymethyl propionate is formed. After removal of the benzene, the product is distilled at reduced pressure. It boils at about 152° C. to 160° C., corrected, at 0.6 mm. pressure. An analysis reveals 62.9 percent carbon and 7.8 percent hydrogen which compares with theoretical values of 62.7 percent carbon and 7.5 percent hydrogen. The desired product may be represented by the following formula:

(18) 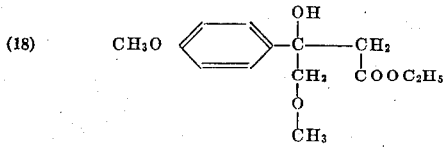

The ethyl β-(p-methoxyphenyl)-β-hydroxy-β-methoxymethyl propionate is treated with an alkaline solution exactly as in Example 1. During this time β-(p-methoxyphenyl)-β-hydroxy-β-methoxymethyl propionic acid is formed. An analysis reveals the presence of 60.0 percent carbon and 6.9 percent hydrogen which compares with theoretical values of 60.0 percent carbon and 6.7 percent hydrogen.

A solution of 4.8 g. of β-(p-methoxyphenyl)-β-hydroxy-β-methoxymethyl propionic acid is refluxed at 110°–120° C. with 16 cc. of a solution of hydrogen bromide in acetic acid previously saturated at 0° C. The cooled reaction mixture is poured into ice water and the desired β-(p-methoxyphenyl)-Δ^{α,β}-γ-butyrolactone is filtered off. It may be recrystallized preferably from dilute alcohol and melts at about 124.5° C., corrected. An analysis reveals the presence of 69.8 percent carbon and 5.6 percent hydrogen which compares with theoretical values of 69.5 percent carbon and 5.3 percent hydrogen. The product may be represented by the following formula:

(19) 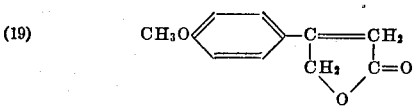

A solution of 0.5 g. of β-(p-methoxyphenyl)-Δ^{α,β}-γ-butyrolactone is refluxed with a mixture of 9 cc. of 48 percent aqueous hydrobromic acid and 6 cc. of acetic acid for 3 hours. The cooled solution is poured into ice water and the desired β-(p-hydroxyphenyl)-Δ^{α,β}-γ-butyrolactone which is formed is filtered off. The lactone may be recrystallized preferably from dilute alcohol or from water and melts at about 245° C., corrected. An analysis reveals the presence of 68.6 percent carbon and 5.1 percent hydrogen which compares with theoretical values of 68.2 percent carbon and 4.6 percent hydrogen. The product may be represented by the following formula:

(20) 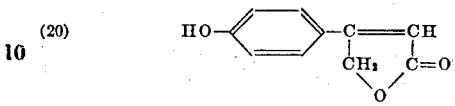

EXAMPLE 8.—Preparation of β-(p-hydroxyphenyl)-Δ^{α,β}-γ-butyrolactone by an alternate procedure Ethyl β-(p-methoxyphenyl)-β-hydroxy-β-methoxymethyl propionate is prepared exactly as in Example 7. It is then refluxed in a mixture of 48 percent aqueous hydrobromic acid and acetic acid for 3 hours. The desired β-(p-hydroxyphenyl)-Δ^{α,β}-γ-butyrolactone which is formed is isolated exactly as in Example 7. As thus prepared the lactone melts at about 245° C., corrected, and the melting point is not depressed when the lactone is mixed with lactone prepared in Example 7.

While preferred embodiments of this invention have been described, various modifications may be made therein without departing from the scope of the appended claims.

What is claimed is:

1. The process of preparing a β-substituted-β-hydroxy-γ-butyrolactone which comprises subjecting a compound represented by the following formula:

$$R\text{—}Mg\text{—}X$$

in which R is a member of the class which consists of acyclic and carbocyclic groups and X is a halogen of the class consisting of chlorine, bromine, and iodine to the action of an alkoxyacetonitrile, treating the resulting product with an aqueous solution to form an alkoxymethyl-R-ketone, reacting the said alkoxymethyl-R-ketone with an ester of a haloacetic acid selected from the class which consists of chloroacetic acid, bromoacetic acid, and iodoacetic acid, in the presence of zinc, treating the resulting product with an aqueous acid solution to form an ester of β-R-β-hydroxy-β-alkoxymethyl propionic acid, subjecting the said ester of β-R-β-hydroxy-β-alkoxymethyl propionic acid to the action of a base in a suitable solvent to form β-R-β-hydroxy-β-alkoxymethyl propionic acid and treating said β-R-β-hydroxy-β-alkoxymethyl propionic acid with a hydrohalogen acid selected from the class which consists of hydrochloric and hydrobromic acids.

2. The process of preparing a β-substituted-β-hydroxy-γ-butyrolactone which comprises subjecting a compound represented by the following formula:

$$R\text{—}Mg\text{—}X$$

in which R is a member of the class which consists of acyclic and carbocyclic groups and X is a halogen of the class which consists of chlorine, bromine, and iodine to the action of an alkoxyacetonitrile, treating the resulting product with an aqueous solution to form an alkoxymethyl-R-ketone, reacting the said alkoxymethyl-R-ketone with an ester of haloacetic acid selected from the class which consists of chloroacetic acid, bromoacetic acid, and iodoacetic acid, in the presence of zinc, treating the resulting product with an aqueous acid solution to form an ester of β-R-β- hydroxy-β-alkoxymethyl propionic acid, subjecting the said ester of β-R-β-hydroxy-β-alkoxymethyl propionic acid to the action of a base in a suitable solvent to form β-R-β-hydroxy-β-alkoxymethyl propionic acid and treating the said β-R-β-hydroxy-β-alkoxymethyl propionic acid with a solution of hydrobromic acid in a liquid saturated aliphatic acid at a temperature between 95° C. and 100° C.

3. The process of preparing a β-substituted-β-hydroxy-γ-butyrolactone which comprises treating a member of the class which consists of β-R-β-hydroxy-β-alkoxymethyl propionic acids and derivatives of β-R-β-hydroxy-β-alkoxymethyl propionic acids, in which R represents a member of the class which consists of acyclic and carbocyclic groups, with a hydrohalogen acid selected from the class which consists of hydrochloric and hydrobromic acids.

4. The process of preparing a β-substituted-β-hydroxy-γ-butyrolactone which comprises treating a member of the class which consists of β-R-β-hydroxy-β-alkoxymethyl propionic acids and derivatives of β-R-β- hydroxy - β - alkoxymethyl propionic acids, in which R represents a member of the class which consists of acyclic and carbocyclic groups, with hydrobromic acid.

5. The process of preparing a β-substituted-Δ$^{α,β}$-γ-butyrolactone which comprises subjecting a compound represented by the following formula:

$$R—Mg—X$$

in which R is a member of the class which consists of acyclic and carbocyclic groups and X is a halogen to the action of an alkoxyacetonitrile, treating the resulting product with an aqueous solution to form an ω-alkoxymethyl-R-ketone, reacting the said ω-alkoxymethyl-R-ketone with an ester of haloacetic acid selected from the class which consists of chloroacetic acid, bromoacetic acid, and iodoacetic acid, in the presence of zinc, treating the resulting product with an aqueous acid solution to form an ester of β-R-β-hydroxy-β-alkoxymethyl propionic acid, subjecting the said ester of β - R - β - hydroxy-β-alkoxymethyl propionic acid to the action of a base in a suitable solvent to form β-R-β-hydroxy-β-alkoxymethyl propionic acid and treating the said β-R - β - hydroxy - β - alkoxymethyl propionic acid with a hydrohalogen acid selected from the class which consists of hydrochloric and hydrobromic acids.

6. The process of preparing a β-substituted-Δ$^{α,β}$-γ-butyrolactone which comprises subjecting a compound represented by the following formula:

$$R—Mg—X$$

in which R is a member of the class which consists of acyclic and carbocyclic groups and X is a halogen to the action of an alkoxyacetonitrile, treating the resulting product with an aqueous solution to form an ω-alkoxymethyl-R-ketone, reacting the said ω-alkoxymethtyl-R-ketone with an ester of bromoacetic acid in the presence of zinc, treating the resulting product with an aqueous solution to form an ester of β-R-β-hydroxy-β-alkoxymethyl propionic acid, subjecting the said ester of β-R-β-hydroxy-β-alkoxymethyl propionic acid to the action of a base in a suitable solvent to form a β - R - β - hydroxy - β - alkoxymethyl propionic acid and treating the said β-R - β - hydroxy - β - alkoxymethyl propionic acid with hydrobromic acid.

7. The process of preparing a β-substituted-Δ$^{α,β}$-γ-butyrolactone which comprises treating a member of the class which consists of β-R-β-hydroxy-β-alkoxymethyl propionic acids and derivatives of β - R - β - hydroxy-β-alkoxymethyl propionic acids, in which R represents a member of the class which consists of acyclic and carbocyclic groups, with a hydrohalogen acid selected from the class which consists of hydrochloric and hydrobromic acids.

8. The process of preparing a β-substituted-Δ$^{α,β}$-γ-butyrolactone which comprises treating a member of the class which consists of β-R-β-hydroxy-β-alkoxymethyl propionic acids and derivatives of β-R-β-hydroxy-β-alkoxymethyl propionic acids, in which R represents a member of the class which consists of acyclic and carbocyclic groups, with hydrobromic acid.

9. The process of preparing a β-substituted-Δ$^{α,β}$-γ-butyrolactone, which comprises heating a β-R-β-hydroxy-γ-butyrolactone, in which R is an organic radical, with a hydrohalogen acid selected from the class which consists of hydrochloric and hydrobromic acids.

10. The process of preparing a β-substituted-Δ$^{α,β}$-γ-butyrolactone, which comprises heating a β-R-β-hydroxy-γ-butyrolactone, in which R is an organic radical, with hydrobromic acid.

11. A β - substituted - β - hydroxy-γ-butyrolactone which is represented by the following formula:

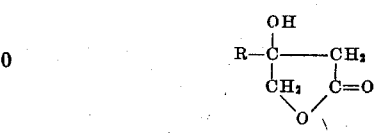

in which R is alkyl group which contains a carbon atom directly attached to the carbon atom of the lactone nucleus.

ROBERT C. ELDERFIELD.
MARTIN RUBIN.